April 7, 1925.　　　　　　　　　　　　　　　1,532,196
R. R. MUNDELL
VEHICLE WHEEL
Filed April 9, 1923　　　　4 Sheets-Sheet 2
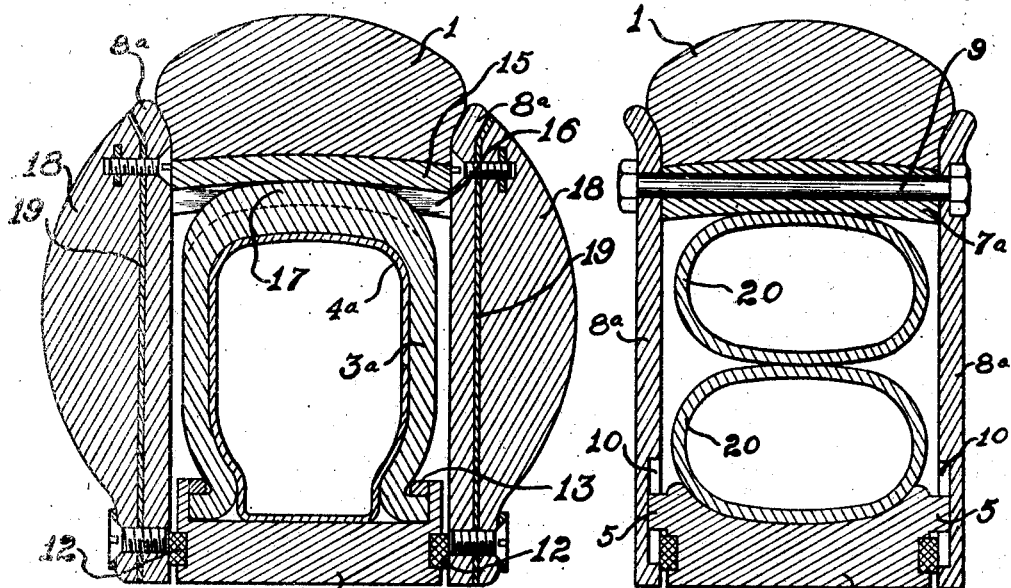
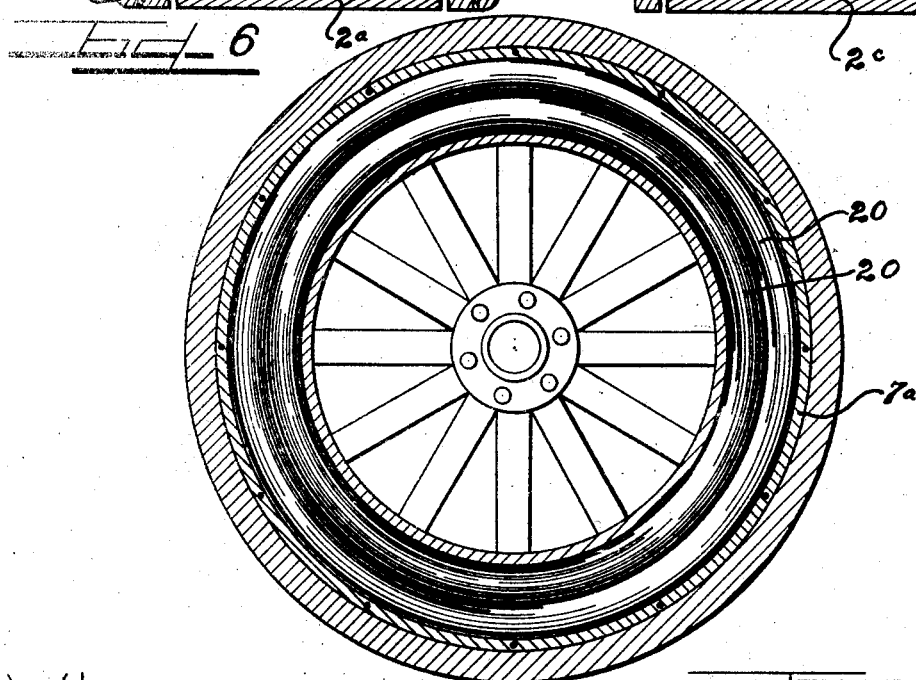
Witnesses
Inventor
Ralph Rogers Mundell
by
Atty April 7, 1925.  1,532,196

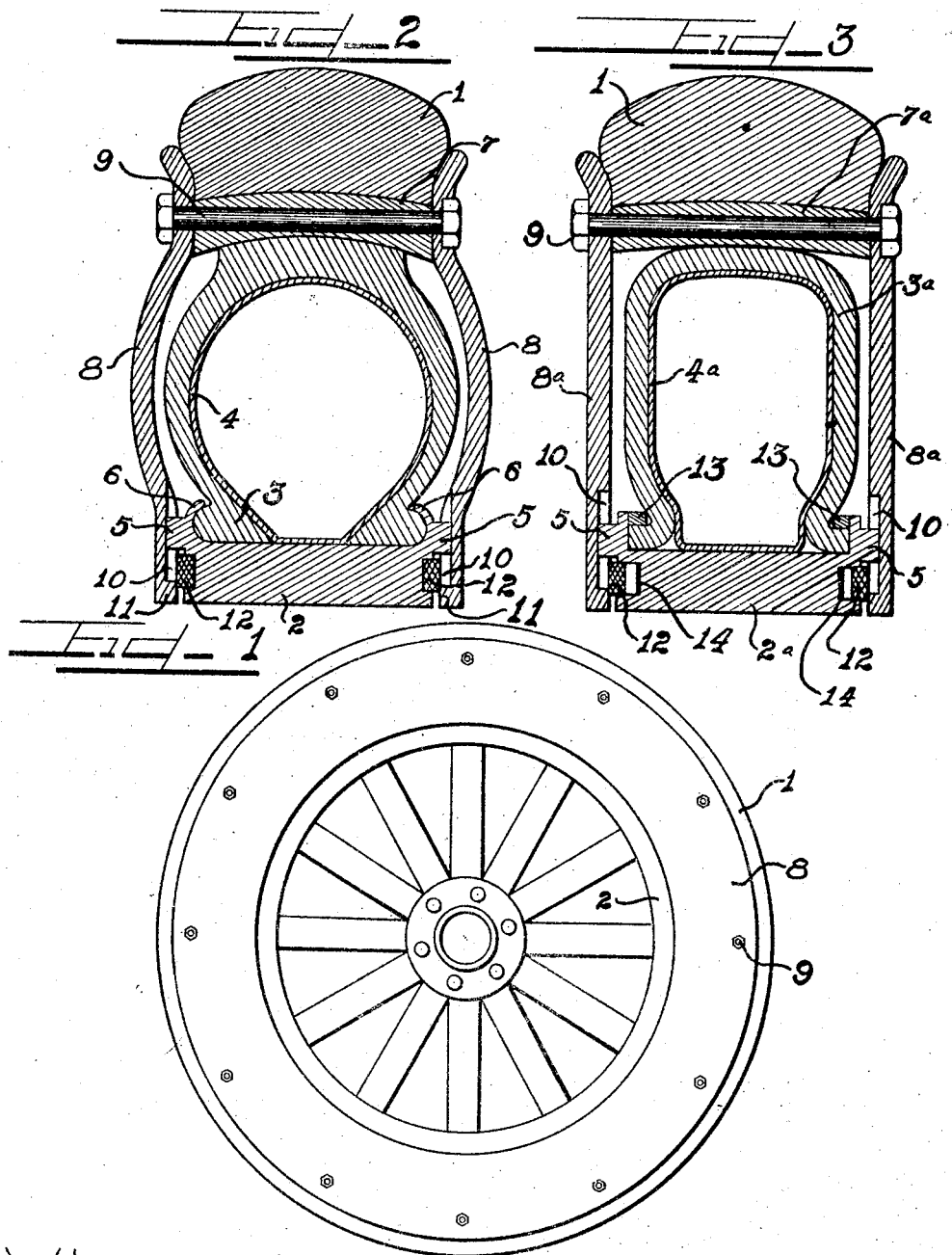

R. R. MUNDELL

VEHICLE WHEEL

Filed April 9, 1923   4 Sheets-Sheet 3

WITNESSES
M. Clifford.

INVENTOR
Ralph Rogers Mundell
by
Atty.

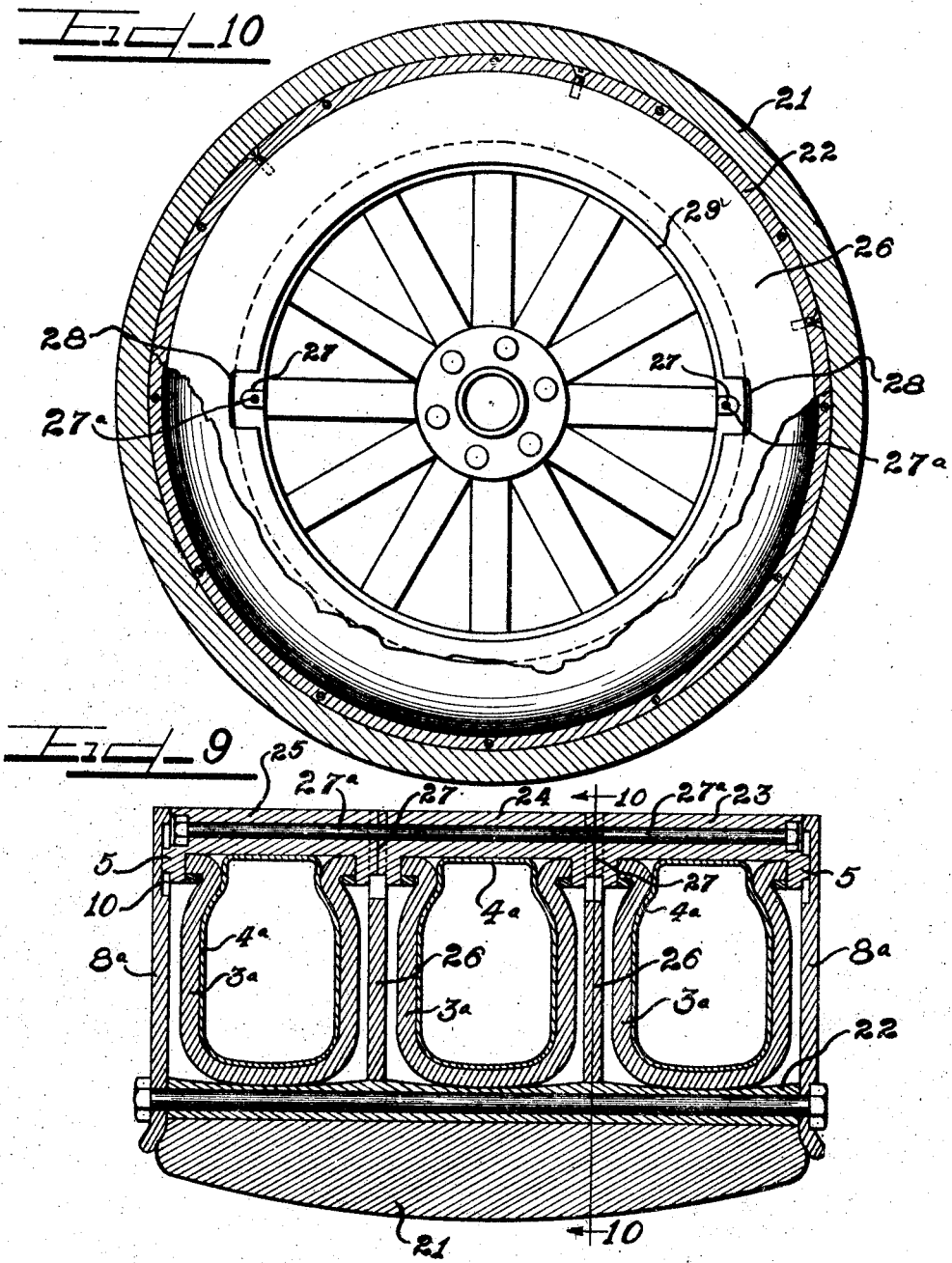

Patented Apr. 7, 1925.

1,532,196

UNITED STATES PATENT OFFICE.

RALPH ROGERS MUNDELL, OF CHICAGO, ILLINOIS.

VEHICLE WHEEL.

Application filed April 9, 1923. Serial No. 630,717.

*To all whom it may concern:*

Be it known that I, RALPH R. MUNDELL, a citizen of the United States, and a resident of Chicago, in the county of Cook and State of Illinois, have invented certain new and useful Improvements in Vehicle Wheels; and I do hereby declare that the following is a full, clear, and exact description of the same, reference being had to the accompanying drawings, and to the numerals of reference marked thereon, which form a part of this specification.

This invention relates to vehicle wheels and concerns itself primarily with the tire and rim construction.

It is an object of this invention to provide a wheel construction having a solid rubber tread or the like which is cushioned or resiliently supported, whereby the advantages of both a solid tire and a pneumatic tire are combined.

It is a further object of this invention to provide a wheel having a pneumatic tube and a solid rubber tire or the like supported thereon.

It is broadly an object of this invention to provide a wheel having a resilient or flexible tire supported upon a contractible and expansible medium such as an air cushion.

With these and other objects in view, which will become more apparent in the following description and disclosures in the drawings, this invention comprises the novel structure and combination of parts hereinafter described and more particularly pointed out and defined in the appended claims.

In the accompanying drawings, which illustrate a preferred embodiment of this invention, and in which similar reference numerals refer to similar features in the different views:

Figure 1 is a side elevational view of a wheel constructed according to this invention.

Figure 2 is an enlarged transverse section through the rim structure thereof.

Figure 3 is an enlarged transverse section through the rim structure of a modified form of the invention.

Figure 4 is an enlarged transverse section through the rim structure of another modification of the invention.

Figure 5 is a section similar to Figure 4 of a further modification of the invention.

Figure 6 is a section through a wheel embodying the modification illustrated in Figure 5 with parts in elevation.

Figure 9 is an enlarged transverse section of a rim structure embodying a still further modification of the invention.

Figure 10 is a section through a wheel embodying the modification shown in Figure 9, upon the line 10—10 of Fig. 9.

Figure 7:
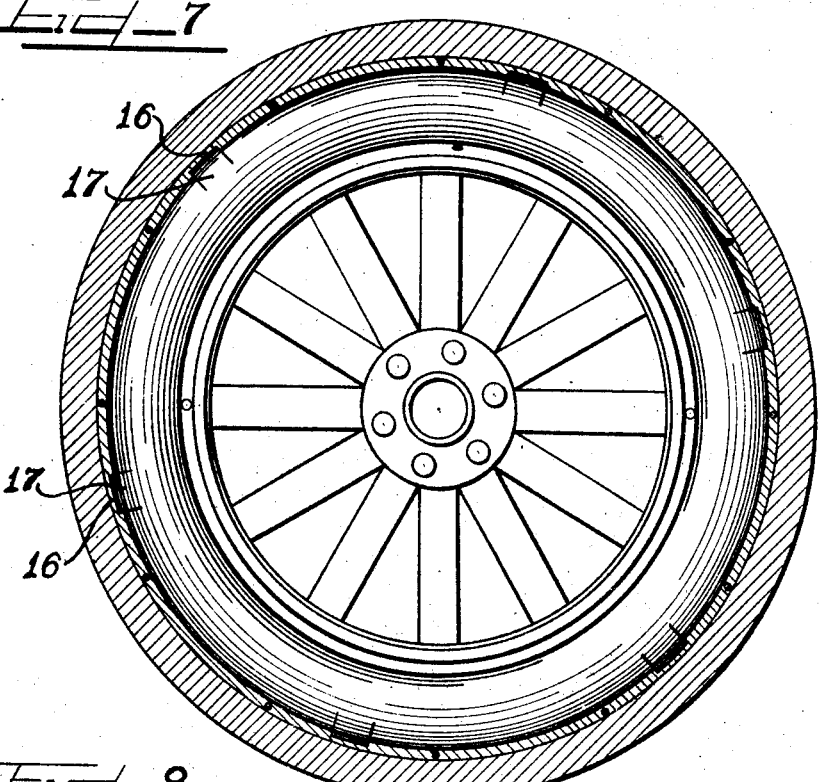
Figure 7 is a section through a wheel embodying the modification shown in Figure 4 with parts in elevation.

In referring now to the drawings, there is illustrated a wheel having a resilient or flexible tread 1 which in the present instance consists of solid rubber. This tread surrounds a contractible and expansible element which affords a yielding cushion for the supported load. In the present instance, the rim structure embodies air cushion means in the form of one or more pneumatic or inflated tubes. A variety of different rim structures are illustrated which will now be described.

Figure 8:
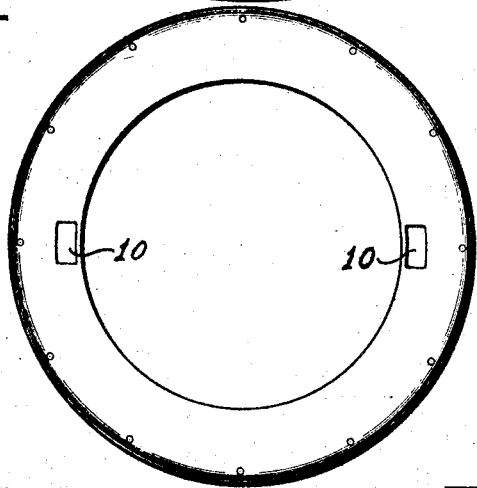
Figure 8 is an elevational view of one of the cheek plates involving this invention looking from the inner side thereof.

In the first form illustrated in Figure 2, a base ring 2 attached to the spokes of the wheel is fashioned for retaining a circular rubber shoe 3 of an inflated tube 4. For this purpose, the base ring 2 is provided with opposed grooves in its outer surface formed by inwardly directed arcuate flanges 6 for receiving the beads of the shoe thereunder. The flanges 6 of said ring are provided with a plurality of outwardly extending lugs 5, two being shown in the present instance, which are laterally opposite as shown in Figure 2 for a purpose to be later described. The outer circular periphery of the shoe 3 is slightly arcuate in a transverse plane and a cylindrical member 7 having a corresponding inner arcuate periphery surrounds the shoe 3 and forms the outer periphery of the structure for supporting the tread 1. The tread 1 is secured upon the member 7 by means of a pair of lateral ring plates 8 which have outwardly flaring margins at their outer edges for embracing the sides of the tread 1. These ring plates are bolted against the sides of the cylindrical member 7 by means of bolts 9 and they extend substantially flush with the inner face of the base ring 2. The adjacent faces of these side or cheek plates 8 near their inner peripheral portions are provided with a pair of diametrically opposite grooves 10 shown more clearly in Figure 8 for receiving the lugs 5. The inner ends of these grooves 10 terminate in limiting shoulders 11 which normally lie some distance inside the lugs 5, with which they are intended to coact when the inner ring member 2 is accordingly shifted. The grooves 10 are considerably wider than the lugs 5 so that sufficient circumferential play is provided in cases where the wheel strikes a bump or obstruction. To exclude the dust from the interior of the structure packing rings or glands 12 may be set in grooves in the lateral sides of the ring 2 to co-operate with the cheek plates 8 to seal the interior of the structure. It will be apparent that the inner ring 2 can shift in any direction against the pneumatic cushion element on account of the slidable connection with the rings 8, and, since the slots 10 are wider than the lugs 5, a certain amount of creeping of the tire tread and its attached parts is possible.

In the modified form shown in Fig. 3, the base ring $2^a$ is provided with edge projections, the inner surfaces of which are at right angles to the base. The edges of the tire shoe $3^a$, which is preferably made of felt or asbestos in this instance, rest against these projections and are anchored to the base ring by the bands 13. Said projections are provided with lugs 5 that operate in grooves 10 in the slidable check plates $8^a$, as in the first form. In this modified form, the shoe $3^a$ and inner tube $4^a$ have a different shape than what is shown in the first form; being of a polygonal oblong shape in cross section. In this case the dust guards 12 are spring pressed against the cheek plates by springs 14 and the tire 1 rests upon a cylindrical member $7^a$ secured between the cheek plates $8^a$ by bolts 9, the outer peripheral portions of the cheek plates embracing opposite sides of the tire as in the first form.

In Fig. 4, the outer ring 15 of the structure is provided with grooves 16 in which lugs 17 on the outer periphery of the shoe $3^a$ are positioned to prevent undue creeping of the tire. In this form, the shoe $3^a$ and inner tube $4^a$ are similar to the modification shown in Fig. 3 and they are similarly retained on the base ring. Additional side cheek rings 18, preferably of rubber or the like, are screwed to the side plates $8^a$, and a fabric filler 19 placed therebetween. The side plates are bolted to the ring 15 and are slidingly mounted at their inner ends similar to the first two forms.

The modification in Fig. 5 comprises a structure very similar to the form shown in Fig. 3, with the exception that the pneumatic or cushion means is different. In this case, a single pneumatic tube 20 oblong in cross section is mounted in a bed or depression formed in the base ring $2^c$, and a second similar pneumatic tube 20 rests upon the first tube. In this case the tire 1 rests upon the cylindrical member $7^a$ to which the cheek plates or rings $8^a$ are bolted, which plates are slidably retained by lugs 5 and grooves 10, as in the form shown in Fig. 3.

In Figs. 9 and 10 is illustrated a structure comprising a broad tire 21 resting upon the outer cylindrical member 22, and confined thereon by lateral rings $8^a$. The base ring consists of a plurality of sections 23, 24 and 25, three in the present instance. These sections are provided with edge projections and the sections 23 and 25 have each lateral lugs 5 on said projections which fit loosely in the grooves 10 of the side plates $8^a$. The adjacent sides of these sections are spaced apart sufficiently to form guideways for receiving the inner circumferential margins of partition rings 26 connected to the outer cylindrical member 22. Upon diametrically opposite sides, bridge pieces 27 span the spaces between the sections 23, 24 and 25, and the partition plates 26 are cut out to receive the bridge pieces 27, as indicated at 28 in Fig. 10. The construction prevents undue creeping of the tire. The partition rings have their inner circumferences spaced a slight distance 29 from the inner surface of the sections to allow for contraction of the rim cushioning element. Each section 23, 24 and 25 supports an inner tube $4^a$ and an outer shoe $3^a$ in a manner similar to that described with reference to Fig. 3, the sections being bolted together by a bolt $27^a$.

It will be noted that the pneumatic cushion means are confined between a pair of cylindrical concentric members, the inner one of which may be said to be yieldingly supported in every direction so that shocks and jars may be absorbed, since it is mounted for relative movement in every direction with respect to the outer member which supports the tire.

I am aware that numerous details of construction may be varied through a wide range without departing from the principles of this invention, and I therefore do not purpose limiting the patent granted otherwise than necessitated by the prior art.

I claim as my invention:

1. In a wheel, a rim structure, comprising an inner cylindrical member, an outer cylindrical member, a pneumatic tube between said members, lateral ring plates secured to one of said members, and lug and groove connections between said ring plates and said other member.

2. In a wheel, a rim structure, comprising an inner cylindrical member, an outer cylindrical member, a pneumatic tube between said members, lateral ring plates secured to one of said members and having a plurality of grooves, and lugs on said other member engaging in said grooves.

3. In a wheel, a rim structure comprising an inner cylindrical member, an outer cylindrical member, a pneumatic tube between said members, lateral ring plates secured to said outer member and having a plurality of grooves, and lugs on said inner member engaged in said grooves.

4. In a wheel, a rim structure, comprising an inner cylindrical member, an outer cylindrical member, a pneumatic tube between said members, lateral ring plates secured to one of said members, and lug and groove connections between said ring plates and said other member, said lugs being narrower than said grooves to permit slight relative creeping movement.

5. In a wheel, a rim structure, comprising an inner cylindrical member, an outer cylindrical member, a pneumatic tube between said members, lateral ring plates secured on said outer member and having a plurality of grooves, and lugs on said inner member engaged in said grooves, said lugs being narrower than said grooves to permit slight relative creeping movement.

In testimony whereof I have hereunto subscribed my name in the presence of two subscribing witnesses.

Dr. RALPH ROGERS MUNDELL.

Witnesses:
 Eli Combs,
 John V. Kirk.